Aug. 26, 1924.
A. G. SHAVER
1,505,974
EXHAUST CONTROL RESERVOIR AND BRAKE VALVE
Filed Nov. 7, 1922
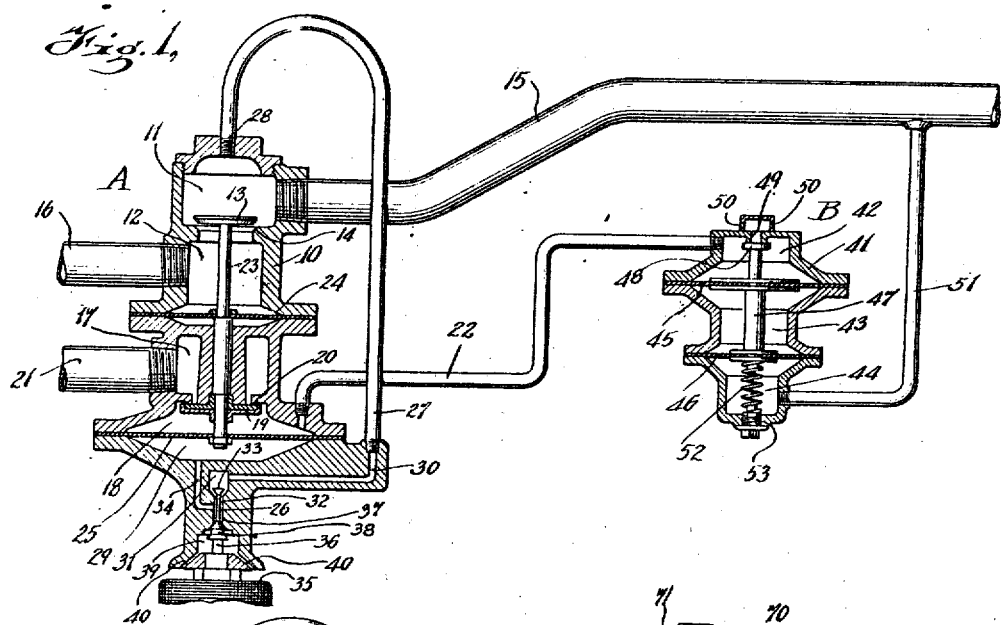
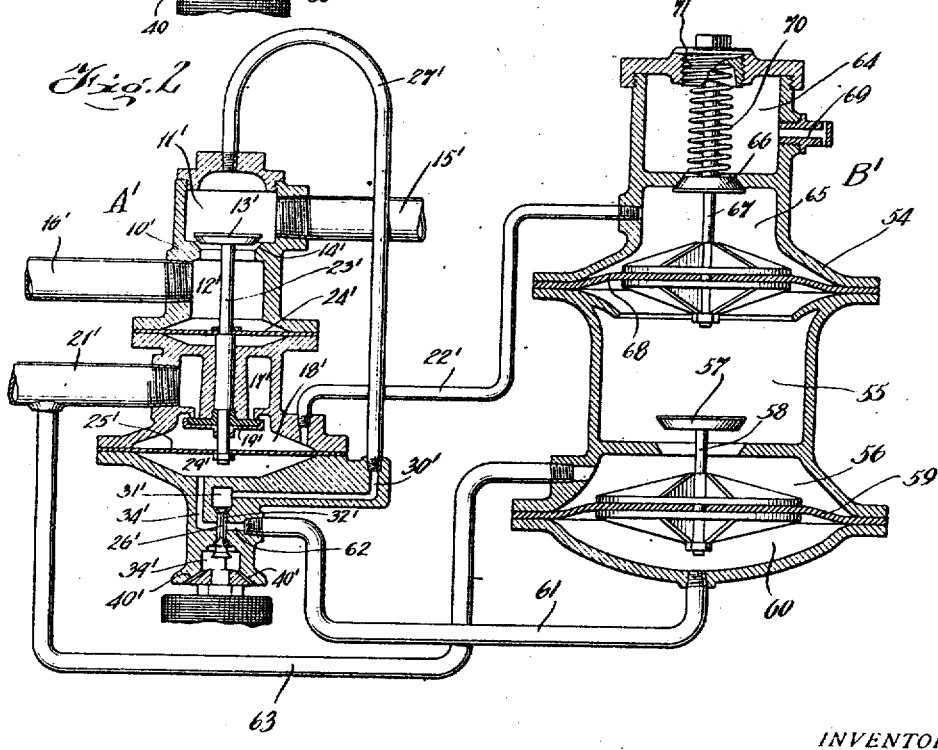
INVENTOR
ARCHIBALD G. SHAVER
BY
Meyers, Cavanagh & Whitehead
ATTORNEYS Patented Aug. 26, 1924.

1,505,974

UNITED STATES PATENT OFFICE.

ARCHIBALD G. SHAVER, OF CHICAGO, ILLINOIS, ASSIGNOR TO THE REGAN SAFETY DEVICES COMPANY, INC., OF NEW YORK, N. Y., A CORPORATION OF NEW YORK.

EXHAUST-CONTROL RESERVOIR AND BRAKE VALVE.

Application filed November 7, 1922. Serial No. 599,512.

*To all whom it may concern:*

Be it known that I, ARCHIBALD G. SHAVER, a citizen of the United States, and resident of Chicago, in the county of Cook and State of Illinois, have invented certain new and useful Improvements in Exhaust-Control Reservoirs and Brake Valves, of which the following is a specification.

This invention relates to train control apparatus, and more particularly to apparatus for automatically operating the air brake system of a train to effect an application of the brakes thereon; and has special reference to the provision of such an apparatus in which the extent or amount of reduction of pressure in the brake pipe of the system is regulated and controlled when an automatic application is effected.

A prime desideratum of my present invention comprehends the provision of an apparatus for controlling the exhaust of air from the brake pipe of an air brake system when an automatic application of the brakes is made so that only that reduction necessary to apply the brakes on the train is obtained, and so that any continued reduction is automatically prevented. My present invention has particular applicability to the train control system disclosed in my copending application Serial No. 292,548 of May 25, 1919, in which the movement of a train is automatically controlled from the roadside so that an automatic application of the brakes of the train is made under unsafe roadside conditions. In the operation of the system for controlling the movement of the train under unsafe conditions, a normally closed brake pipe valve is automatically opened, opening the brake pipe to exhaust to effect the reduction in pressure of the air therein to produce the application of the brakes. In the preferred operation of this system the thus opened brake pipe valve is maintained open until safe running conditions of the train are restored, the brake pipe thus being opened to exhaust for an extended period of time, this resulting in a continued exhausting of the air in the brake pipe beyond that point necessary for application of the brakes which is undesirable in practice. By my present invention, I propose to automatically regulate or control the reduction of pressure in the brake pipe so that when the brake pipe valve is automatically opened and maintained open the exhaust is so automatically controlled that only a given or fixed reduction of brake pipe pressure is obtained, after which the exhaust is closed to obviate any further and unnecessary reduction in brake pipe pressure.

The principal objects of my present invention may be said to include, besides the provision of an apparatus for controlling the exhaust of the brake pipe when an automatic application of the brakes is made; the further provision of an electromagnetically operated brake pipe valve maintained closed under normal running conditions of the train and automatically operated under unsafe running conditions of the train to open the brake pipe to exhaust associated with an exhaust control valve for opening the exhaust when the brake pipe valve is opened and for closing the exhaust after a given reduction of brake pipe pressure has been attained; the further provision of a combined reservoir, brake valve and exhaust control valve so inter-related that when the train is running under unsafe roadside conditions the reservoir valve will be operated to close communication between the engineman's brake valve and the main reservoir and the brake pipe valve will be operated to open communication between the brake pipe and the exhaust and the exhaust control valve will be governed to permit a predetermined reduction in the pressure of the brake pipe of the airbrake system; the still further provision of a combined reservoir and brake valve and exhaust control valve in which reservoir pressure is employed for controlling the operation of the combined reservoir and brake valve and the exhaust control valve; the further provision of an exhaust control valve operative to avoid an automatic application of the brakes providing the necessity for retarding or stopping the vehicle is recognized and appropriate action therefor has been taken by the engineman; and the still further provision of an apparatus of this nature in which the parts are inter-related by simple laws to effect a simple construction operating in an efficient manner.

To the accomplishment of the foregoing and such other objects as may hereinafter appear, my invention consists in the elements and their relation one to the other, as hereinafter particularly described and sought to be defined in the claims, reference being had to the accompanying drawing which shows preferred embodiments of my invention, and in which:

Fig. 1 is a view of one form of my invention with parts shown in section, and

Fig. 2 is a view of a modification with parts shown in section.

Referring now more in detail to the drawings, and to Fig. 1 thereof, my invention comprises in its preferred form a combined reservoir and brake valve A operative for normally opening communication between the main reservoir and the engineman's brake valve of an air brake system and for normally closing communication between the brake pipe and exhaust and operable under unsafe running conditions of the train for closing communication between the main reservoir and the engineman's brake valve and for opening the brake pipe to atmosphere, and an exhaust control valve B cooperating with the reservoir and brake valve A for controlling or regulating the exhaust of the brake pipe so that a predetermined reduction in pressure in the brake pipe is had when the reservoir and brake valve A is operated under said unsafe running condition.

The combined reservoir and brake valve A in its preferred form comprises a casing 10 provided with the intercommunicating chambers 11 and 12, the intercommunication of which is controlled by a valve including the valve head 13 and the valve seat 14 therefor, the chamber 11 being connected for communication with the main reservoir, (not shown) by means of the reservoir pipe 15, and the chamber 12 being connected for communication with the engineman's brake valve (not shown) by way of the pipe 16, these parts comprising the means for controlling the communication between the main reservoir and the engineman's brake valve. The casing 10 is further provided with the intercommunicating chambers 17 and 18, the intercommunication of which is controlled by a valve including the valve head 19 and the valve seat 20 therefor, the chamber 17 being connected for communication to the brake pipe 21 of the air brake system, and the chamber 18 being connected for communication to an exhaust pipe 22, these parts comprising the brake pipe valve for controlling the opening and closing of the brake pipe. In the preferred construction the valves 13—14 and 19—20 are simultaneously operated, the valve heads 13 and 19 being preferably mounted on a single valve stem 23 and operated so that under normal running conditions the valve 13—14 is open to permit the flow of air from the main reservoir to the engineman's brake valve, and the valve 19—20 normally closed to maintain the brake pipe closed, this condition of operation being shown in Fig. 1 of the drawings, and so that under unsafe running conditions of the train when an application of the brakes is desired to be effected, the valve 13 will be closed to close communication between the main reservoir and the engineman's brake valve, and the valve 19 will be opened to open the brake pipe to exhaust.

For automatically controlling the operation of the combined reservoir and brake valve, I provide pneumatic and electro-responsive means cooperating to hold the parts in the condition shown in Fig. 1 under normal running conditions and to actuate the same to effect an application of the brakes under unsafe running conditions, the said means comprising the spaced diaphragms 24 and 25 fixed to the valve stem 23, the diaphragm 25 being arranged so as to be made responsive to the action of an electromagnetically controlled primary valve 26 controlling the flow of reservoir air from a pipe 27 connected at one end, as at 28, to the chamber 11, and at the other end to an air chamber 29 underneath the diaphragm 25, the air under normal conditions flowing from the reservoir pipe 15 and the chamber 11 to and through the pipe 27, a channel 30 communicating therewith, a chamber 31 above the primary valve, port 32 controlled by the valve head 33 of the said primary valve, and a channel 34 opening into the chamber 29, the primary valve 26 being to this end held in ascended position for opening the port 32 by means of an electromagnet 35 which is normally energized to maintain its core 36 connected to the primary valve 26 in ascended position. With the electromagnet and primary valve so operated, the air in the chamber 29 is under reservoir pressure, this pressure being exerted on the diaphragm 25 to maintain the valve heads 13 and 19 in their ascended positions against the action of the reservoir pressure in the chamber 12 exerted on the smaller diaphragm 24 and the weight of the valve parts.

When the electromagnet 35 is deenergized, as in response to an unsafe roadside condition, the primary valve 26 is moved to descended position with the valve head 33 thereof closing the port 32 for closing communication between the reservoir pipe 15 and the chamber 29, and for opening a port 37 controlled by a second valve head 38 which is normally in closed condition, as shown in Fig. 1 of the drawings, and which under the unsafe roadside conditions is opened to connect the channel 34 to a chamber 39 by way of the port 37, the said chamber 39 being open to atmosphere by way of the ducts 40. By the provision of this construction, it will therefore be seen that upon deenergization of the electromagnet 35 the chamber 29 is closed to the reservoir and is opened to exhaust, so that the weight of the valve parts and the pressure operative on the diaphragm 24 move the valve parts to descended position for effecting the closing of the reservoir valve 13—14 and the opening of the brake pipe valve 19—20 to effect the opening of the brake pipe 21 to the exhaust line 22 for making an automatic application of the brakes.

As hereinbefore stated, it is a principal object of the present invention to control the exhaust of the brake pipe when an automatic application of the brakes is effected, to the end of producing a predetermined reduction of pressure in the brake pipe sufficient to apply the brakes and to prevent any continued and unnecessary pressure reduction. To this end the exhaust control valve B hereinbefore referred to is provided, this valve being connected to control the exhaust and being governed by air under reservoir pressure and comprising a casing 41 provided with an exhaust chamber 42, an intermediate neutral chamber 43, and a pressure chamber 44, the casing being subdivided into these chambers by means of the diaphragms 45 and 46 carried by a valve stem 47 provided at one end with a valve head 48 controlling a port 49 open to atmosphere by way of the ducts 50. The chamber 42 is connected for communication with the exhaust line 22, and the chamber 44 is connected for open communication with the reservoir pipe 15 by means of the pipe line 51.

Under normal conditions of operation, the valve 48 is closed for closing the chamber 42, the valve stem 47 being held in ascended position by means of the reservoir air pressure in chamber 44 acting on the diaphragm 46 and the pressure of a spring 52, the compression of which is preferably made adjustable by means of the adjustable screw 53, the combined pressure of the air and the spring acting on the diaphragm 46 for sustaining the valve and its parts in closed condition. When the reservoir and brake valve A is automatically operated to effect the application of the brakes, the brake pipe air from the brake pipe 21 exhausts by way of the exhaust line 22 into the chamber 42, the pressure of this air being exerted on the diaphragm 45 for opposing the pressure active on the diaphragm 46, the relative sizes of the diaphragm being such that under these conditions the valve parts are moved to descended position to open the valve port 49 and permit the air to exhaust to atmosphere by way of the ducts 50. This flow of air to atmosphere continues until the pressure in the chamber 42 on the upper diaphragm 45 is less than that of the combined pressure active on the diaphragm 46, and when this point is reached the valve 48 and the valve parts are forced upwardly to close the port 49 and prevent any further exhaust from taking place. With this construction, therefore, it will be seen that a certain prescribed or predetermined reduction of brake pipe air may be made, sufficient to apply the brakes on the train, and that when the desired reduction is made, any further wasteful reduction is obviated. It will be further seen that by adjusting the compression of the spring 52, the amount of reduction may be predetermined and varied so that the apparatus may be set for whatever reduction is desired, as for example, ten, fifteen or twenty-five pounds. Another advantage of this construction resides in the fact that if the engineman operates the train properly applying the brakes when necessary, no automatic application will take place.

Referring now to Fig. 2 of the drawings, wherein I show a modified form of my invention, the apparatus comprises a combined reservoir and brake valve A' and an exhaust control B' cooperating therewith.

The combined reservoir and brake valve A' in this form of my invention is preferably of the same construction as the combined reservoir and brake valve A heretofore described, comprising the casing 10' having parts identical with those shown in Fig. 1, the like parts being indicated by primed reference characters, the said combined valve being connected to the reservoir pipe 15', to the pipe 16' running to the engineman's brake valve and the brake pipe 21' as in the form shown in Fig. 1.

In the form of my invention shown in Fig. 2, I control the exhaust through the pipe 22' in such a manner that the reduction in brake pipe pressure can always be made irrespective of the value of air pressure in the brake pipe at any time; and to this end the exhaust control valve B' is governed combinedly by reservoir and brake pipe pressure, with the brake pipe pressure made the basis on which a reduction in pressure is effected. To accomplish this, the exhaust control valve B' includes a casing 54 provided with the intercommunicating chambers 55 and 56, the intercommunication of which is controlled by a valve 57, the said valve being carried by a valve stem 58 attached to a diaphragm 59 on the underneath side of which is provided a chamber 60, the chamber 60 being connected by means of a pipe line 61 to a channel 62 communicating with the port 32', and the chamber 56 being connected by means of the pipe line 63 to the brake pipe 21'. With this construction, it will be seen that under normal conditions the chamber 60 is supplied with air under reservoir pressure flowing from the reservoir pipe 15' through the pipe 27', the channel 30', the chamber 31' and port 32', channel 62 and pipe 61; and the air in the chamber 56 is under brake pipe pressure, air from the brake pipe 21' flowing through the pipe 63 into the chamber 56, the difference in pressure in the chambers causing the diaphragm 59 to move upwardly for opening the valve 57 and maintaining the same open so that the chamber 55 is supplied with air under brake pipe pressure.

The exhaust control valve B' is further provided with intercommunicating chambers 64 and 65, intercommunication between which is controlled by a valve 66 fixed to a stem 67 attached to a diaphragm 68, the said diaphragm being arranged between the chambers 55 and 65, the chamber 64 being normally open to atmosphere by way of the port 69, and the chamber 65 being connected to the chamber 18' of the reservoir and brake valve A' by way of the exhaust line 22'. Under normal operating conditions, the air under brake pipe pressure in the chamber 55 acts upon the diaphragm 68 to move the valve 66 and its attached parts to ascended position to close communication between the chambers 64 and 65, the action of the pressure in the chamber 55 being counter to the combined action of the weight of the valve parts, the compressive force of a spring 70 which is active on the valve head 66 to tend to open the same, and the compression of which is adjustable by means of the screw cap 71, and air at low pressure which is trapped in the chamber 65. When the reservoir and brake valve A' is operated to open the brake pipe 21' to exhaust, the air in the brake pipe flows from the brake pipe 21' through the chambers 17' and 18' to and through the exhaust line 22' to the chamber 65, this air under brake pipe pressure being operative on the upper side of the diaphragm 68 to assist the action of the spring 70 and the weight of the parts in opposition to the brake pipe pressure in the chamber 55 to effect the opening of the valve head 66 so that the exhaust line 22' is open to the chamber 64 and to atmosphere. Simultaneously with this action, as the primary valve 26' is moved to descended position the pipe 61 and channel 62 are closed to reservoir pressure and open to atmosphere through the chamber 39' and ducts 40', resulting in the exhausting of the air in the chamber 60 for effecting the closing of the valve 57, and the trapping of air under brake pipe pressure in the chamber 55. With the valve 57 closed and the valve 66 opened under this condition of operation, the air from the brake pipe 21' continues to exhaust until the pressure therein assisted by the compressive force of the spring 70 and the weight of the valve parts is less than the air under brake pipe pressure trapped in the chamber 55, at which time the diaphragm 68 will be acted upon by the greater pressure in the chamber 55 to again close or reset the valve 66 so that any further reduction in pressure in the brake pipe is obviated, a predetermined reduction in pressure in the brake pipe being thus obtained.

With this construction shown in Fig. 2, it will be further seen that when the parts are again actuated to assume normal operating conditions, the chamber 60 is again opened to reservoir pressure to effect the opening of the valve 57 so that the chamber 55 is supplied with air under brake pipe pressure as it then exists. It will therefore be seen that the brake pipe pressure is taken as a basis or standard for control of the exhaust, and since at any initial action of the exhaust control valve the air in the chambers 55 and 65 at opposite sides of the diaphragm 68 is at the same pressure, the compression spring 70 controls the amount of reduction to be obtained, and this may be regulated to effect any given reduction desired, such as for example fifteen, twenty or twenty-five pounds.

The use and operation of my exhaust control reservoir and brake valve will in the main be fully apparent from the above detailed description thereof. It will be apparent that when automatic application of the brakes is made, responsive to unsafe running conditions of the train, in addition to operating the valve 13 or 13' of the combined reservoir and brake valve A or A' to close intercommunication between the main reservoir and the engineman's brake valve, the valve 19 or 19' is operated for opening the brake pipe 21 or 21' to the exhaust line 22 or 22', the exhaust being controlled by the exhaust control valve B or B' to effect a given or prescribed reduction in the brake pipe pressure and to prevent a continued reduction of the same. It will be further seen that the amount of reduction in the brake pipe pressure may be regulated or varied to suit the different operating conditions met with in service by the adjustment of the compression spring 62 or 70, this being fixed for any desired operating condition.

While I have shown my device in the preferred forms, it will be obvious that many changes and modifications may be made in the structure disclosed without departing from the spirit of the invention, defined in the following claims.

I claim:

1. In a train control apparatus, in combination with the main reservoir and brake pipe of an air brake system, means for opening the brake pipe to exhaust to effect an application of the brakes, and an exhaust control mechanism connected to the said means in the line of exhaust and having connections to the brake pipe and main reservoir to be governed by brake pipe and main reservoir pressures for automatically controlling the said exhaust to effect a predetermined reduction of pressure in the said brake pipe.

2. In a train control apparatus, in combination with the main reservoir and brake pipe of an air brake system, a normally closed valve operable for opening the brake pipe to exhaust to effect an application of the brakes, and an exhaust control mechanism connected to the said valve in the line of exhaust and having connections to the brake pipe and main reservoir to be governed by brake pipe and main reservoir pressures for automatically controlling the said exhaust to effect a predetermined reduction of pressure in the said brake pipe.

3. In a train control apparatus, in combination with the main reservoir and brake pipe of an air brake system, a normally closed valve operable for opening the brake pipe to exhaust to effect an application of the brakes and for maintaining the same open, and an exhaust control mechanism connected to the said valve in the line of exhaust and having connections to the brake pipe and main reservoir to be governed by brake pipe and main reservoir pressures for automatically controlling the said exhaust to effect a predetermined reduction of pressure in the said brake pipe.

4. In a train control apparatus, in combination with the main reservoir and brake pipe of an air brake system, means for opening the brake pipe to exhaust to effect an application of the brakes, and an exhaust control mechanism connected to the said means in the line of exhaust and having connections to the brake pipe and main reservoir to be governed by brake pipe and main reservoir pressures for automatically controlling the said exhaust to effect a constant change in the reduction of brake pipe pressure irrespective of variations in the said brake pipe pressure.

5. In a train control apparatus, in combination with the main reservoir and brake pipe of an air brake system, means for opening the brake pipe to exhaust to effect an application of the brakes, and mechanism having connections to the brake pipe and main reservoir and controlled by the air pressures therein for automatically controlling the said exhaust, the said mechanism including means for opening the exhaust to atmosphere when the brake pipe is opened and operative for closing the exhaust after a prescribed reduction of brake pipe pressure has been effected.

6. In a train control apparatus, in combination with the main reservoir and brake pipe of an air brake system, a normally closed valve for opening the brake pipe to exhaust to effect an application of the brakes, and mechanism having connections to the brake pipe and main reservoir and controlled by the air pressures therein for automatically controlling the said exhaust, the said mechanism including means for opening the exhaust to atmosphere when the said valve is opened and operative for closing the exhaust after a prescribed reduction of brake pipe pressure has been effected.

7. In a train control apparatus, in combination with the main reservoir and brake pipe of an air brake system, an electromagnetically controlled valve, means for opening the brake pipe to exhaust to effect an application of the brakes, and exhaust control mechanism having connections to the brake pipe and main reservoir and controlled by the air pressures therein for automatically controlling the said exhaust, the said mechanism including means for opening the exhaust to atmosphere when the valve means is opened and operative for closing the exhaust after a prescribed reduction of brake pipe pressure has been effected.

8. In a train control apparatus, in combination with the main reservoir and brake pipe of an air brake system, means for opening the brake pipe to exhaust to effect an application of the brakes, and mechanism independent of and connected to said means and having connections to the brake pipe and main reservoir and controlled by the air pressures therein for automatically controlling the said exhaust, the said mechanism including means for opening the exhaust to atmosphere when the brake pipe is opened and operative for closing the exhaust after a prescribed reduction of brake pipe pressure has been effected.

9. In a train control apparatus, in combination with the main reservoir and brake pipe of an air brake system, a normally closed valve, means for opening the brake pipe to exhaust to effect an application of the brakes, and mechanism connected to the valve means and having connections to the brake pipe and main reservoir and controlled by the air pressures therein for automatically controlling the said exhaust, the said mechanism including normally closed valve means for opening the exhaust to atmosphere when the brake pipe is opened and operative for closing the exhaust after a prescribed reduction of brake pipe pressure has been effected.

10. In a train control apparatus, in combination with the brake pipe of an air brake system, means for opening the brake pipe to exhaust to effect an application of the brakes, and adjustable provisions for automatically controlling the said exhaust to effect a predetermined reduction of pressure in the said brake pipe.

11. In a train control apparatus, in combination with the brake pipe of an air brake system, means for opening the brake pipe to exhaust to effect an application of the brakes, and adjustable provisions for automatically controlling the said exhaust comprising instrumentalities opening the exhaust to atmosphere when the brake pipe is opened operative for closing the exhaust after a prescribed reduction of brake pipe pressure has been effected.

12. In a train control apparatus, in combination with the brake pipe of an air brake system, means for opening the brake pipe to exhaust to effect an application of the brakes, and provisions for automatically controlling the said exhaust to effect a constant change in the reduction of brake pipe pressure irrespective of variations in the said brake pipe pressure.

13. In a train control apparatus, in combination with the brake pipe of an air brake system, means for opening the brake pipe to exhaust to effect an application of the brakes, and provisions for automatically controlling the said exhaust to effect a reduction in the brake pipe pressure to a predetermined constant quantity.

14. In a train control apparatus for use in combination with an air brake system, a normally open reservoir valve located between the reservoir and the engineer's brake valve, a normally closed brake pipe valve, means for simultaneously actuating the valves to close the reservoir valve and to open the brake pipe valve to exhaust to effect an application of the brakes, and provisions for automatically controlling the said exhaust to effect a predetermined reduction of pressure in the brake pipe.

15. In a train control apparatus for use in combination with an air brake system, a normally open reservoir valve located between the reservoir and the engineer's brake valve, a normally closed brake pipe valve, electromagnetically controlled provisions for simultaneously actuating the valves to close the reservoir valve and to open the brake pipe valve to exhaust to effect an application of the brakes, and provisions for automatically controlling the said exhaust to effect a predetermined reduction of pressure in the brake pipe.

16. In a train control apparatus for use in combination with an air brake system, a normally open reservoir valve located between the reservoir and the engineer's brake valve, a normally closed brake pipe valve, electromagnetically controlled provisions for simultaneously actuating the valves to close the reservoir valve and to open the brake pipe valve to exhaust to effect an application of the brakes, and an exhaust control valve for automatically controlling the said exhaust to effect a predetermined reduction of pressure in the brake pipe.

17. In a train control apparatus for use in combination with an air brake system, a normally open reservoir valve located between the reservoir and the engineer's brake valve, a normally closed brake pipe valve, means for simultaneously actuating the valves to close the reservoir valve and open the brake pipe valve to exhaust to effect an application of the brakes, and provisions for automatically controlling the said exhaust comprising instrumentalities opening the exhaust to atmosphere when the brake pipe is opened, operative for closing the exhaust after a prescribed reduction of brake pipe pressure has been effected.

18. In a train control apparatus for use in combination with an air brake system, a normally open reservoir valve located between the reservoir and the engineer's brake valve, a normally closed brake pipe valve, electromagnetically controlled valve means for simultaneously actuating the valves to close the reservoir valve and open the brake pipe valve to exhaust to effect an application of the brakes, and an exhaust control valve for automatically controlling the said exhaust comprising instrumentalities opening the exhaust to atmosphere when the brake pipe is opened, operative for closing the exhaust after a prescribed reduction of brake pipe pressure has been effected.

19. In a train control apparatus for use in combination with an air brake system, a normally open reservoir valve located between the reservoir and the engineer's brake valve, a normally closed brake pipe valve, means for simultaneously actuating the valves to close the reservoir valve and to open the brake pipe valve to exhaust to effect an application of the brakes, and adjustable provisions for automatically controlling the said exhaust to effect a predetermined reduction of pressure in the brake pipe.

20. In a train control apparatus for use in combination with an air brake system, a normally open reservoir valve located between the reservoir and the engineer's brake valve, a normally closed brake pipe valve, means for simultaneously actuating the valves to close the reservoir valve and open the brake pipe valve to exhaust to effect an application of the brakes, and provisions for automatically controlling the said exhaust to effect a constant change in the reduction of brake pipe pressure irrespective of variations in the brake pipe pressure.

21. In a train control apparatus for use in combination with an air brake system, a normally open reservoir valve located between the reservoir and the engineer's brake valve, a normally closed brake pipe valve, means for simultaneously actuating the valves to close the reservoir valve and open the brake pipe valve to exhaust to effect an application of the brakes, an exhaust control valve connected to be governed by reservoir pressure to normally close the exhaust and permit the same to open upon opening of the brake pipe valve and to again close the same after a predetermined reduction of the brake pipe pressure has been effected.

22. In a train control apparatus for use in combination with an air brake system, a normally open reservoir valve located between the reservoir and the engineer's brake valve, a normally closed brake pipe valve, means for simultaneously actuating the valves to close the reservoir valve and open the brake pipe valve to exhaust to effect an application of the brakes, an exhaust control valve connected to be governed by reservoir pressure to open upon opening of the brake pipe valve and to again close the same after a predetermined reduction of brake pipe pressure has been effected.

23. In a train control apparatus for use in combination with the reservoir and brake pipe of an air brake system, a normally closed brake pipe valve, means for opening the same to exhaust to effect an application of the brakes, and an exhaust control valve connected to the reservoir to be governed by reservoir pressure to open upon opening of the brake pipe valve and to close after a predetermined reduction of brake pipe pressure has been effected.

24. In a train control apparatus for use in combination with the reservoir and brake pipe of an air brake system, a normally closed brake pipe valve, means for opening the same to exhaust to effect an application of the brakes, and an exhaust control valve connected to the reservoir to be governed by reservoir pressure to normally close the exhaust and permit the same to open upon opening of the brake pipe valve and to close after a predetermined reduction of brake pipe pressure has been effected.

25. In train control apparatus, in combination with the brake pipe of an air brake system, means for opening the brake pipe to exhaust to effect an application of the brakes, and provisions for automatically controlling the said exhaust to effect a reduction in the brake pipe pressure, the said provisions being active provided a reduction in brake pipe pressure applying the brakes is not already in effect.

26. A train brake control apparatus comprising a valve for controlling an exhaust port, a pneumatic device for operating the said valve, means for admitting fluid at brake pipe pressure to one side of said device, a second valve for controlling the admission of fluid at brake pipe pressure to the opposite side of said device, a second pneumatic device for operating the second valve, and means for admitting fluid at brake pipe and reservoir pressures respectively onto opposite sides of the said second pneumatic device.

27. A train brake control apparatus comprising a valve controlling an exhaust port, a diaphragm device for operating the said valve, a port for admitting fluid at brake pipe pressure to one side of said device, a second valve for controlling the admission of fluid at brake pipe pressure to the opposite side of said device, a second diaphragm device for operating the second valve, and means for admitting fluid at brake pipe and reservoir pressures respectively onto opposite sides of said second diaphragm device.

28. A train brake control apparatus comprising a normally closed valve controlling an exhaust port, a pneumatic device for operating the said valve, means for admitting fluid at brake pipe pressure to one side of said device, a second and normally open valve for controlling the admission of fluid at brake pipe pressure to the opposite side of said device, a second pneumatic device for operating the second valve, means for admitting fluid at brake pipe and reservoir pressures respectively onto opposite sides of said second pneumatic device, and means for reducing the reservoir pressure to open the first valve and close the second valve.

29. A train brake control apparatus comprising a casing, a valve therein controlling an exhaust port, a pneumatic device therein for operating the said valve, a port in said casing for admitting fluid at brake pipe pressure to one side of said device, a second valve in said casing for controlling the admission of fluid at brake pipe pressure to the opposite side of said device, a second pneumatic device for operating the second valve, and ports in the casing for admitting fluid at brake pipe and reservoir pressures respectively onto opposite sides of said second pneumatic device.

30. A train brake control apparatus comprising a casing, a valve therein controlling an exhaust port, a chamber in said casing, a pneumatic device for operating said valve located at one side of said chamber, means for admitting fluid at brake pipe pressure to one side of said pneumatic device, a second valve located on the opposite side of said chamber for controlling the admission of fluid at brake pipe pressure into said chamber and to the opposite side of said device, a second pneumatic device for operating the second valve, and means for admitting fluid at brake pipe and reservoir pressures respectively onto opposite sides of said second pneumatic device.

31. A train brake control apparatus comprising a casing, a normally closed valve therein controlling an exhaust port, a chamber in said casing, a diaphragm device for operating said valve located at one side of said chamber, means for admitting fluid at brake pipe pressure to one side of said diaphragm device, a second and normally open valve located on the opposite side of said chamber for controlling the admission of fluid at brake pipe pressure into said chamber and to the opposite side of said device, a second diaphragm device for operating the second valve, and means for admitting fluid at brake pipe and reservoir pressures respectively onto opposite sides of said second diaphragm device.

32. A train brake control apparatus comprising a casing, a pair of communicating chambers therein separated by an exhaust port, a valve controlling the exhaust port, a second pair of communicating chambers in said casing, a pneumatic device for operating said valve located between adjacent chambers of the different pairs, means for admitting fluid at brake pipe pressure to one side of said pneumatic device, a second valve controlling the communication between the second pair of chambers for controlling the admission of fluid at brake pipe pressure to the opposite side of said device, a second pneumatic device for operating the second valve, and means for admitting fluid at brake pipe and reservoir pressures respectively onto opposite sides of said second pneumatic device.

Signed at New York city, in the county of New York and State of New York, this 1st day of November, A. D. 1922.

ARCHIBALD G. SHAVER.

DISCLAIMER.

1,505,974.—*Archibald G. Shaver*, Chicago, Ill. EXHAUST-CONTROL RESERVOIR AND BRAKE VALVE. Patent dated August 26, 1924. Disclaimer filed September 23, 1926, by the assignee, *The Regan Safety Devices Company, Inc.*

Hereby enters this disclaimer as to claims 13, 25, and 26 and further disclaims any interpretation of that part of claim 14, reading: " and provisions for automatically controlling the said exhaust to effect a predetermined reduction of pressure in the brake pipe " broader than that calling for the predetermined reduction of pressure in the brake pipe irrespective of variations in the said brake-pipe pressure.

[*Official Gazette October 12, 1926.*]